United States Patent [19]

Drexler

[11] Patent Number: 4,814,594
[45] Date of Patent: Mar. 21, 1989

[54] UPDATABLE MICROGRAPHIC POCKET DATA CARD

[75] Inventor: Jerome Drexler, Los Altos Hills

[73] Assignee: Drexler Technology Corporation, Mountain View, Calif.

[21] Appl. No.: 70,837

[22] Filed: Jul. 7, 1987

Related U.S. Application Data

[63] Continuation-in-part of Ser. No. 798,146, Nov. 14, 1985, Pat. No. 4,680,459, which is a continuation of Ser. No. 721,383, Apr. 9, 1985, abandoned, which is a continuation-in-part of Ser. No. 693,856, Jan. 22, 1985, which is a continuation-in-part of Ser. No. 443,596, Nov. 22, 1982, Pat. No. 4,503,135, which is a continuation-in-part of Ser. No. 238,832, Feb. 27, 1981, Pat. No. 4,360,728, which is a continuation-in-part of Ser. No. 238,833, Feb. 27, 1981, abandoned.

[51] Int. Cl.$^4$ .............................................. G06K 19/00
[52] U.S. Cl. .................................... 235/487; 235/454; 283/75; 283/904; 346/76 L
[58] Field of Search .............. 235/454, 484, 487, 488; 283/67, 70, 74; 346/76 L, 135.1

[56] References Cited

U.S. PATENT DOCUMENTS

| | | | |
|---|---|---|---|
| 4,089,008 | 5/1978 | Suga et al. | 354/5 |
| 4,171,864 | 10/1979 | Jung et al. | 350/3.61 |
| 4,236,332 | 12/1980 | Domo | 40/2.2 |
| 4,254,329 | 3/1981 | Gokey et al. | 235/379 |
| 4,278,756 | 7/1981 | Bouldin | 430/414 |
| 4,523,777 | 6/1985 | Holbein | 283/67 |
| 4,544,181 | 10/1985 | Maurer | 283/74 |
| 4,680,459 | 7/1987 | Drexler | 235/487 |

Primary Examiner—A. D. Pellinen
Assistant Examiner—Leon K. Fuller
Attorney, Agent, or Firm—Thomas Schneck

[57] ABSTRACT

A strip of optical contrast laser recording material is disposed on the wallet-size card, and has laser written characters recorded thereon. The characters are formed by a plurality of pixels, similar in nature to the dots forming dot matrix characters, except that the pixels themselves are formed of spots. The spots are disposed in a geometric regular array and are usually written one column at a time until a complete pixel is formed. Machine readable and visually readable characters may be combined on a single data strip.

11 Claims, 2 Drawing Sheets

UPDATABLE MICROGRAPHIC POCKET DATA CARD

CROSS REFERENCE TO RELATED APPLICATIONS

This is a continuation-in-part of patent application Ser. No. 798,146, filed Nov. 14, 1985, now U.S. Pat. No. 4,680,459, which is a continuation of patent application Ser. No. 721,383, filed Apr. 9, 1985, abandoned, which is a continuation-in-part of patent application Ser. No. 693,856 filed Jan. 22, 1985, which is a continuation-in-part of patent application Ser. No. 443,596 filed Nov. 22, 1982, now U.S. Pat. No. 4,503,135, granted Mar. 5, 1985, which is a continuation-in-part of patent application Ser. No. 238,832 filed Feb. 27, 1981, now U.S. Pat. No. 4,360,728, granted Nov. 23, 1982; and patent application Ser. No. 238,833 filed Feb. 27, 1981, now abandoned.

DESCRIPTION

1. Technical Field

The invention relates to optical data information storage and more particularly to a method for recording laser written updatable micrographic information on a pocket-or wallet-size card.

2. Background Art

In optical data storage cards, reliability and ease of reading the data are important. Data may be recorded in an office environment, but need to be read in a dirty environment or when no card reading machine is available, such as in an emergency. For example, medical-record cards should be readable in an ambulance, at the scene of an accident, or on a battlefield. In such conditions, it may be difficult or impossible to read digitally recorded data on a card or paper copies in a file.

In U.S. Pat. No. 4,254,329 to Gokey et al., an information retrieval system includes a microfiche data base of two types of microfiche cards. One type is machine readable only, while the other has both machine readable and visually readable information. This information cannot be updated.

In U.S. Pat. No. 4,236,332, Domo discloses a medical record card containing a microfilm portion having some data visible to the eye and other data visible by magnification. The directly visible data is alphanumeric character codes pertaining to emergency medical conditions of the patient and the magnifiable data portions detail the medical history. This information cannot be updated.

An object of the invention is to provide a method and system for recording laser written information on a card that can be visually read by a person with the help of magnifying optics.

It is another object of the invention to provide a card in which visually read information can be recorded in place on the card.

It is another object of the invention to provide a method and system for updating information on a wallet-size card that can be read visually by a person.

DISCLOSURE OF THE INVENTION

The above objects have been met with a method and system for recording, in situ, visually readable information on a strip of optical contrast laser recording material, disposed on a pocket- or wallet-size card.

A laser beam records visually readable information on a strip of optical storage material, in situ, either by ablation, melting, physical or chemical change. The recording process produces spots having different reflectivity relative to a surrounding field which is detectable by a light detector. Micrographic characters are recorded as pixels with each pixel being a matrix of spots on the laser recordable material. These spots are written with a laser so that lines of pixels are formed as the card passes the laser location so that characters are formed one portion at a time.

Visually read characters created by the spots may include alphanumerics, script writing, foreign language alphabets and numerics, maps, foreign language picture characters such as Chinese and Japanese characters, mathematical symbols, logic symbols, scientific and musical notations, and other symbols and notations. It could also include emblems, logos, codes, and trademarks.

The uniform surface reflectivity of this reflective strip before recording typically would range between 8% and 65%. For a highly reflective strip the average reflectivity over a laser recorded spot might be in the range of 5% to 25%. Thus, the reflective contrast ratio of the recorded spots would range between 2:1 and 7:1. Laser recording materials are known in the art that create either low reflectivity spots in a moderate to high reflectivity field or high reflectivity spots in a low reflectivity field. An example of the latter type is described in U.S. Pat. No. 4,343,879. When the reflectivity of the field is in the range of 8% to 20% the reflective spots have a reflectivity of about 40%. The reflective contrast ratio would range from 2:1 to 5:1. Photographic pre-formatting would create spots having a 10% reflectivity in a reflective field or 40% in a low reflectivity field. No processing after laser recording is required when the recording strip is a direct-read-after-write material. Laser recording materials also may be used that require heat processing after laser recording.

By means of in situ laser recording, information that needs to be read in an emergency where no card reading machine is available is written in microscopically readable form. The information would include personal and medical information, transactions, office forms, multiple language information, titles and instructions. Maps, charts, tables, graphs, diagrams, and written music could also be recorded in this form.

BEST MODE FOR CARRYING OUT THE INVENTION

Figure 1:
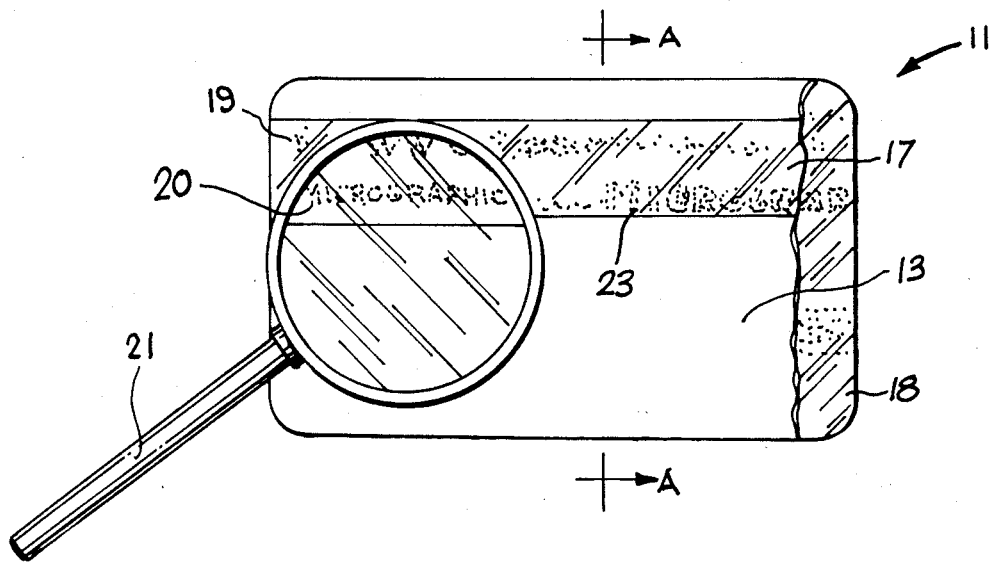
FIG. 1 is a top plan view of a pocket data card having micrographic information in accord with the present invention.

With reference to FIG. 1, a data card 11 is illustrated having a size common to most credit cards. The width dimension of such a card is approximately 54 mm and the length dimension is approximately 85 mm. These dimensions are not critical, but preferred because such a size easily fits into a wallet or pocket and has historically been adopted as a convenient size for automatic teller machines and the like. The card's base 13 is a dielectric, usually a plastic material such as polyvinyl chloride or similar material. Polycarbonate plastic is preferred. The surface finish of the base should have low specular reflectivity, preferably less than 10%.

Base 13 carries strip 17. The strip is typically 16 or 35 millimeters wide and extends the length of the card, or extends the full width of the card, as shown by strip 18 at the right of the card. The strip may have any selected size and orientation. The strip is relatively thin, approximately 60–200 microns, although this is not critical. Strips of laser recording material may be applied to both sides of card 11. The strip may be applied to the card by any convenient method which achieves flatness.

Figure 3:
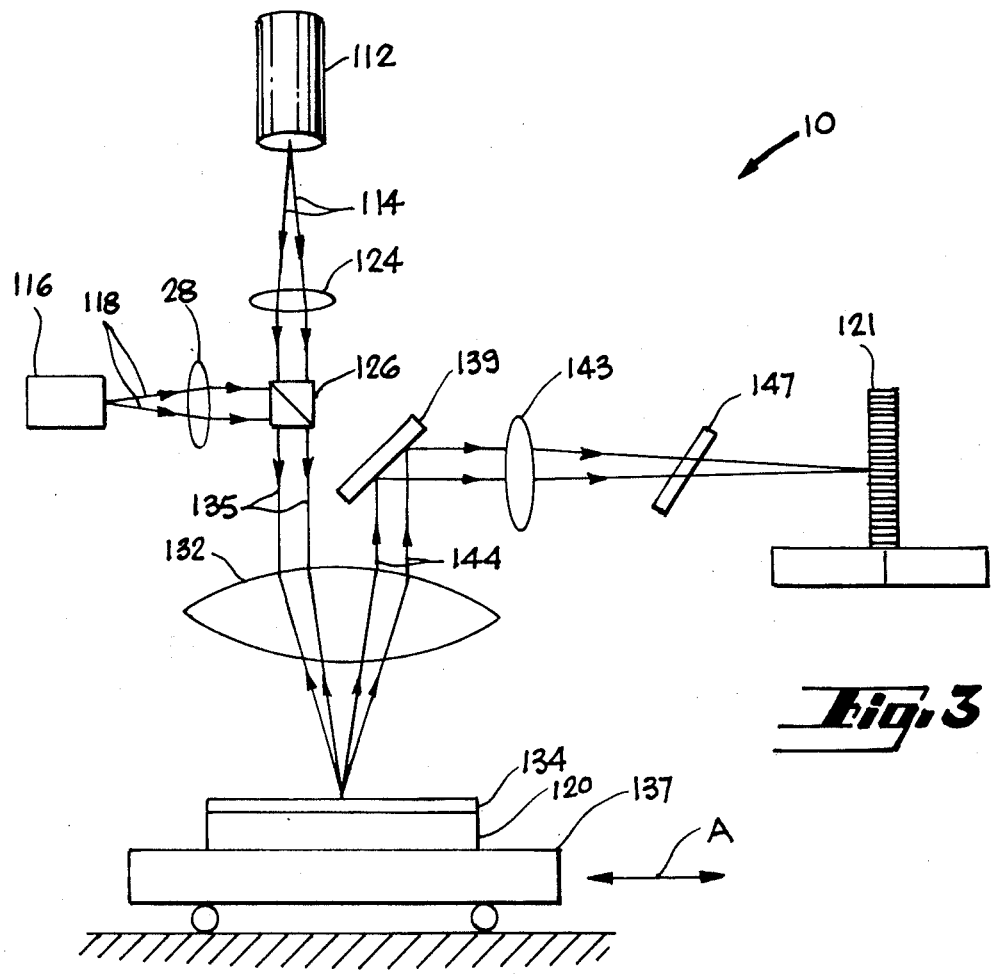
FIG. 3 is a plan view of a reader/writer for dot images, including the character forming pixels of the present invention.

The strip 17 is adhered to the card with an adhesive and is covered by a transparent laminating sheet seen in FIG. 3 which serves to keep strip 17 flat, as well as protecting the strip from dust and scratches. The sheet is a thin, transparent plastic laminating material or a coating, such as a transparent lacquer. The material is preferably made of polycarbonate plastic.

The high resolution laser recording material which forms strip 17 may be any of the reflective recording material which have been developed for use as direct read-after-write (DRAW) optical disks, so long as the materials can be formed on thin substrates. An advantage of reflective materials over transmissive materials is that the write equipment is all on one side of the card and automatic focus is easier, and twice as much data can be stored by using both sides. For example, the high resolution material described in U.S. Pat. No. 4,230,939 issued to de Bont, et al. teaches a thin metallic recording layer of reflective metals such as Bi, The, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. Suspensions of reflective metal particles in organic colloids also form low melting temperature laser recording media. Silver is one such metal. Typical recording media are described in U.S. Pat. Nos. 4,314,260, 4,298,684, 4,278,758, 4,278,758, 4,278,756 and 4,269,917, all assigned to the assignee of the present invention.

The laser recording material which is selected should be compatible with the laser which is used for writing on it. Some materials are more sensitive than others at certain wavelengths. Good sensitivity to infrared light is preferred because infrared is affected least by scratches and dirt on the transparent laminating sheet. The selected recording material should have a favorable signal-to-noise ratio and form high contrast spots with the write system with which it is used.

The material should not lose data when subjected to temperatures of about 180° F. (82° C.) for long periods. The material should also be capable of recording at speeds of at least several thousand laser spots/sec. This generally precludes the use of materials that require long heating times or that rely on slow chemical reactions in the presence of heat, which may permit recording of only a few laser spots/sec. A large number of highly reflective laser recording materials have been used for optical data disk applications.

Strip 17 may have visually readable characters 23 and may have microscopic visually readable information 20. The information is recorded as a matrix of character spots by a laser by writing in a pattern over the matrix and writing laser spots at designated locations to form micrographic characters. The microscopic characters are generally read by magnification, such as through optical magnifier 21. Machine readable data 19 may also be disposed on strip 17.

A laser forms spots in the surrounding field of the reflective layer itself, by ablation, melting, physical or chemical change, thereby altering the reflectivity in the spot. The information is read by viewing the optical reflective contrast between the surrounding reflective field of unrecorded areas and the recorded spots. Spot reflectivity of less than half of the reflectivity of the surrounding field produces a contrast ratio of at least two to one, which is sufficient contrast for reading. Greater contrast is preferred. Reflectivity of the strip field of about 50% is preferred with reflectivity of a spot in the reflective field being less than 10%, thus creating a contrast ratio of greater than five to one. Alternatively, data may also be recorded by increasing the reflectivity of the strip. For example, the recording laser can melt a field of dull microscopic spikes on the strip to create flat shiny spots. This method is described in SPIE, Vol. 329, Optical Disk Technology (1982), p. 202. A spot reflectivity of more than twice the surrounding spiked field reflectivity produces a contrast ratio of at least two to one, which is sufficient contrast for reading.

Figure 2:
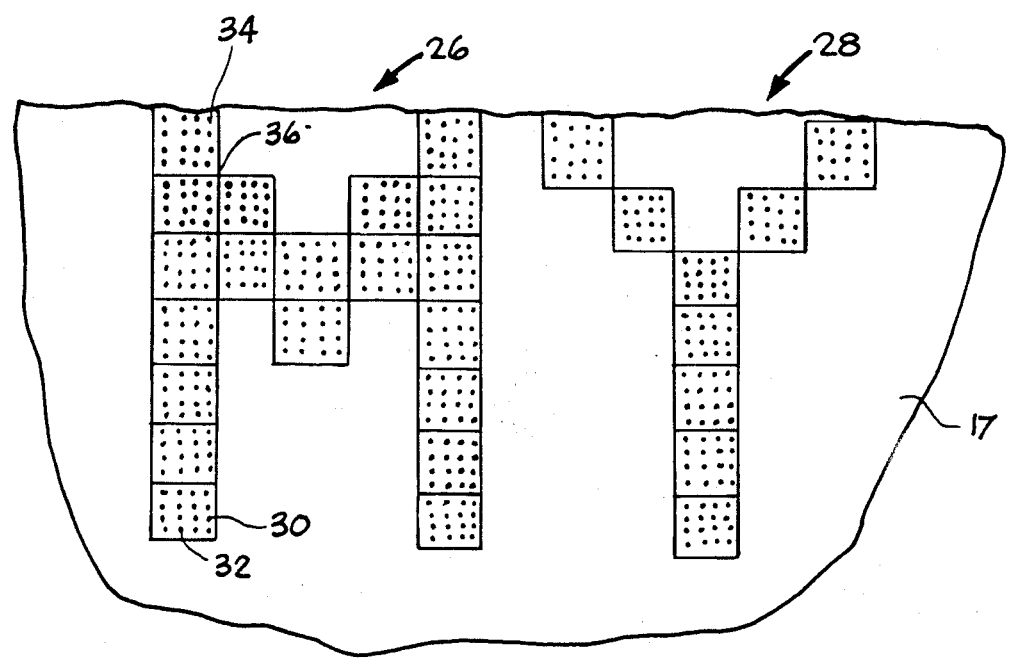
FIG. 2 is a top enlarged view of laser written characters on a portion of an optical recording material on a data card in accord with the present invention.

In FIG. 2, visually readable information is recorded on a portion of strip 17. The information may be personal information, medical records, transactions, office forms, instructions, multiple language information, or titles for the digital record on the strip. The information is in the form of characters, such as the alphanumeric characters "M" 26 and "Y" 28, shown in FIG. 2 by way of example. The characters 26 and 28 are made up of pixels formed by laser recorded character spots with the minimum character height being one millimeter.

Pixel 30 is seen to be an array of dots 32 arranged in a 4×4 pattern. A preferable number would be 10×10 dots per pixel, with each dot being of a size between 3 to 5 microns. Each pixel would have an edge dimension of approximately 100 microns and the pixels would be grouped in lines so that the height of a character was at least one millimeter for visual reading.

The pixels are not formed individually. Rather, a line of dots is written as a strip of laser recording material moves at right angles to the writing path of a laser. The laser forms columns of dots in a linear stitching pattern, but only writes where pixels are designated. For example, in column 34 seven pixels have been designated, but in column 36 only two pixels have been designated. The method of character formation resembles dot matrix printing where the pixels of the present invention are analogous to dots. In dot matrix printing, a number of wires arranged in columnar alignment are advanced and retracted by solenoids to form columns of character dots. A plurality of such columns of dots forms a character. In the present invention, a plurality of columns of pixels forms a character, but unlike dot matrix printing, the pixel itself must be formed by a plurality of spots arranged in an array. The positioning of the spots should be regular so that the spot pattern may be read by a machine, as well as by eye. Some patterns on a card may be only machine readable and it is desirable to write all characters in the same manner whether to be read by machine or visually.

With reference to FIG. 3, an optical data reading and writing system, in the present instance a data spot reader-writer 110, comprises a low power laser 112 capable of emitting a modulated laser beam 114, a second light source 116 emitting a second beam 118, optical elements for directing beams 114 and 118 to an optical storage medium, here disposed on a card 120, and at least one detector 122 for reading data on card 120.

Laser 112 is used only for writing data spots on card 120 and during data reading is kept below the threshold for writing on the medium. Beam 114 should, when writing, deliver sufficient laser pulse energy to the surface of the recording material to create spots. Typically, 5-20 milliwatts is required, depending on the recording material. A 20 milliwatt semiconductor laser, focussed to a five micron beam size, records at temperatures of about 200° C. and is capable of creating spots in less than 25 microseconds. Other laser beams, focussed to one to ten micron beam diameters, are also capable of recording spots on optical storage media. The wavelength of the laser should be compatible with the recording material.

Second light source 116 is preferably a light emitting diode (LED), and is used for reading data spots on card 120 and for tracking, clocking and focussing. LED 116 emits low intensity beam 118 during both reading and writing. Second light source 116 may also be a defocussed laser.

Laser beam 114 is directed through a lens 124 to a polarizing beam splitter 126. Beam 118 from LED 116 is directed through a lens 128 to beamsplitter 126. Beams 114 and 118 entering beamsplitter 126 emerge as a combined beam sharing a slightly displaced optical axis 135. Combined beam on axis 135, which beam is made up of low intensity beam 118 and laser beam 114 at high power during data writing and low or zero power during data reading, is directed through a focusing lens 132 onto card 120. Card 120 is typically provided with a transparent scratch resistant protective coating 134 disposed on the data storage medium on the card. Lens 132 has a focal length so as to bring laser beam 114 to a narrow spot on the order of one to ten micrometers in diameter on card 120. Lens 132 typically has a three to four millimeter focal length. Beam 118 does not focus to a narrow spot but rather illuminates a substantially larger area of the medium on card 120 than beam 114. Typically, beam 118 illuminates an area ranging from a 10 micrometer diameter up to a 60 micrometer diameter. Beam 118 may be elliptical.

Card 120 is supported on a platform 137 movable in a direction indicated by arrow A. Motion of platform 137 provides course scanning in a longitudinal direction along data tracks on the medium on card 120. The system 110 is movable in a direction in and out of the page for course scanning in a lateral direction across data tracks. Fine scanning may be provided by moving one or more optical elements in system 110, such as lens 132.

Light illuminating the medium on card 120 is reflected from the medium and scattered or absorbed by data spots or prerecorded information on the medium. Light scattered or absorbed from the spots contrasts with the light reflected from the surrounding field where no spots exist. The light is then directed to at least one detector 121 by lens 132, a mirror 139, and a lens 143. Lens 132 is shown off-center with respect to optical path 135 so that reflected light returns through lens 132 along a separate optical path 144. This allows a non-polarization sensitive tracking and focussing system to be used to thereby reduce the cost of the medium.

The focal length of lens 143 is determined by the size and configuration of detector 121, and vice versa. Spots on the medium should be imaged onto detector elements of detector 121. The magnification of a spot is determined by the focal lengths of lenses 132 and 143. Preferably, the focal length of lens 143 is on the order of 10 mm, but lenses have been used with a focal length as long as 360 mm. In that case, a plurality of turning mirrors, represented by mirror 147, are generally provided to fold the optical path 144 into a compact structure. No such turning mirrors 147 are required for lenses 143 having a focal length of about 10mm.

Figure 4:
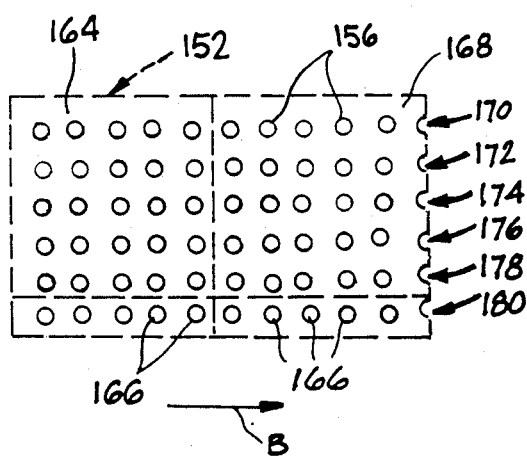
FIG. 4 is an enlarged view of character forming pixels of the kind shown in FIG. 2.

With reference to FIG. 4, a magnified view of laser writing on the laser recording material strip portion 152 may be seen. Strip portion 152 has laser recorded data spots 156 and prerecorded clock spots 166 thereon. Data spots 156 and clock spots 166 are aligned in spaced apart parallel columns. Prerecorded information comprises reference position information, such as a plurality of parallel track or clock spots 166. Such information is used to generate position error signals used as feedback in motor control.

A data card carrying pixels 164 and 168 is moved transversely in the direction indicated by arrow B beneath a detector. As the spots pass beneath detector elements, they are read. In those instances where digital data is used, rather than pixels, a regular array of spots would not be present. Rather, spots encoding data would be present, with each spot being separately readable. The pixels of FIG. 4 may be read individually and counted to indicate the presence of pixels, although in normal use the pixels would be read visually. A combination of machine readable data, micrographic characters visible only under magnification, as well as visually readable characters exceeding one millimeter in height may all be combined on a single strip, as shown in FIG. 1, yet all may be read by machine, or some may be read by machine and others visually with or without magnification.

Figure 5:
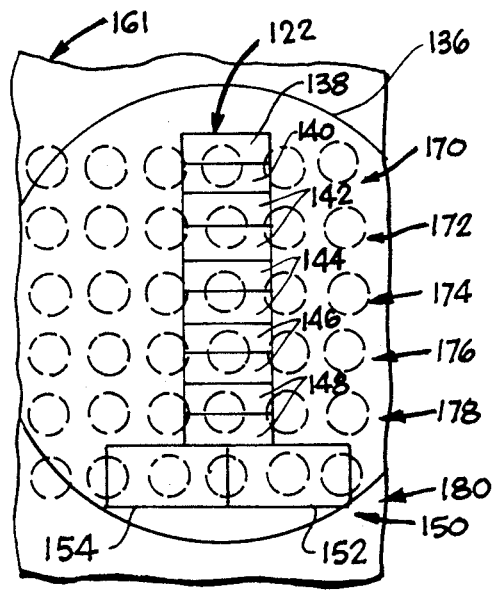
FIG. 5 is a detailed plan of optical apparatus for reading and writing on the pixels illustrated in FIG. 3.

In FIG. 5, an image 161 on a data card is focussed on detectors 122 and 150. The data on the medium is arranged in five data paths 170, 172, 174, 176 and 178 and a servo and clocking track 180. A large area beam illuminates portions of each of the data paths and clock or servo track detected by detectors 122 and 150.

Detector 122 comprises pairs of elements, such as elements 138 and 140. Four other pairs of elements 142, 144, 146 and 148 are also shown. Each pair of elements reads one of the data paths 170, 172, 174, 176 or 178. Signals from one pair of elements, such as elements 138 and 140, may be subtracted to produce a tracking error signal. Detector 150 has two detector elements 152 and 154 which produce a focus error signal. Other autofocus detectors known in the art may also be used. In this manner, a light beam with a large illumination area is used for both reading data paths, as well as prerecorded servo information.

I claim:
1. An updatable micrographic data card comprising,
a wallet size card having a strip of optical contrast laser recording material disposed thereon,
a plurality of laser written characters disposed on said strip, each character formed from a plurality of laser recorded character pixels, each pixel formed by a uniform array of laser recorded spots aligned in a matrix of rows and columns, said laser recorded spots being a first level of organization to form characters and which are written line by line at designated locations where said uniform arrays of spots forms said pixels, said pixels being a second level of organization, said characters being a third level of organization which have a character height exceeding one millimeter and being laser recordable in place on the card wherever unused areas of the recording material exist.

2. The card of claim 1 wherein said array of laser recorded spots is a uniform pattern of four or more spots.

3. The card of claim 1 wherein said strip has a width substantially equal to the width of the card.

4. The card of claim 1 wherein machine readable indicia is disposed on said strip.

5. The card of claim 1 further having a plurality of laser written micrographic characters disposed on the strip, each character formed of a matrix of laser recorded spots aligned in rows and columns, said micrographic characters being eye readable using at least 20 power magnification, but not eye readable using 5 power magnification or less.

6. The card of claim 1 further having machine readable indicia disposed on said strip and also having a plurality of laser written micrographic characters disposed on the strip, each micrographic character formed of a matrix of laser recorded spots aligned in rows and columns, said micrographic characters being eye readable using at least 20 power magnification, but not eye readable using 5 power magnification or less.

7. A method of laser writing of eye readable characters comprising,
   writing in a scan-like manner a plurality of spots with a laser in groups forming uniform pixels, said spots being a first level of organization to form characters, said spots being aligned in rows and columns and being written line by line at designated locations where said uniform arrays of spots forms said pixels, said pixels being a second level of organization,
   grouping pixels in juxtaposed relation forming eye readable characters, said characters being a third level of organization in forming said characters.

8. The method of claim 7 further defined by writing said spots in a rectangular array of rows and columns.

9. The method of claim 8 further defined by writing said spots in an array of more than 24 spots.

10. The method of claim 7 further defined by
   (a) grouping pixels in linear positions for forming a portion of a character beneath a laser, then
   (b) moving the card relative to the laser and forming the next adjacent portion of a character, then
   (c) repeating card movement until the character is completion.

11. The method of claim 7 further defined by writing said spots with a diode laser.

* * * * *